United States Patent [19]
Kohmoto et al.

[11] Patent Number: 5,276,552
[45] Date of Patent: Jan. 4, 1994

[54] LIGHT INTERCEPTING MASK OF LENS

[75] Inventors: Shinsuke Kohmoto; Hiroshi Nomura, both of Tokyo, Japan

[73] Assignee: Asahi Kogaku Kogyo Kabushiki Kaisha, Tokyo, Japan

[21] Appl. No.: 478,152

[22] Filed: Feb. 6, 1990

[30] Foreign Application Priority Data

Feb. 9, 1989 [JP] Japan ............................ 1-14482[U]

[51] Int. Cl.$^5$ .................. G02B 27/00; G02B 9/08; G03B 1/18
[52] U.S. Cl. .................. 359/601; 359/614; 359/738; 354/195.12
[58] Field of Search ...................... 350/124–; 355/61; 359/694–; 354/195.10–; 356/310, 432, 234–

[56] References Cited

U.S. PATENT DOCUMENTS

| | | | |
|---|---|---|---|
| 3,759,153 | 9/1973 | Aimo et al. | 350/580 |
| 3,809,459 | 5/1974 | Wakamiya et al. | 350/164 |
| 3,882,517 | 5/1975 | Land et al. | 350/318 |
| 4,166,678 | 9/1979 | Schrader | 350/580 |
| 4,183,661 | 1/1980 | Ohkura | 355/61 |
| 4,208,102 | 6/1980 | Ohkura | 359/824 |
| 4,436,415 | 3/1984 | Emoto | 355/55 |
| 4,461,547 | 7/1984 | Ikari et al. | 350/580 |
| 4,576,446 | 3/1986 | Kamata | 359/699 |
| 4,759,618 | 7/1988 | Kamata | 359/703 |
| 4,911,542 | 3/1990 | Nishio et al. | 350/429 |
| 4,918,476 | 4/1990 | Tejima | 359/221 |
| 5,018,832 | 5/1991 | Terunuma et al. | 359/694 |
| 5,034,762 | 7/1991 | Kohmoto | 354/195.12 |
| 5,038,162 | 8/1991 | Tejima | 354/221 |

FOREIGN PATENT DOCUMENTS

| | | |
|---|---|---|
| 2725403 | 12/1978 | Fed. Rep. of Germany . |
| 3150852 | 8/1982 | Fed. Rep. of Germany . |
| 59-12112 | 1/1984 | Japan . |
| 214810 | 12/1984 | Japan .............. 359/827 |
| 232409 | 10/1986 | Japan .............. 350/257 |
| 63-286836 | 11/1988 | Japan . |
| 84218 | 3/1989 | Japan .............. 359/738 |
| 140136 | 6/1989 | Japan .............. 359/819 |
| 3276111 | 12/1991 | Japan .............. 359/738 |
| 0562438 | 7/1944 | United Kingdom . |
| 2006973 | 5/1979 | United Kingdom . |
| 2006974 | 5/1979 | United Kingdom . |
| 2228101 | 8/1990 | United Kingdom . |
| 2229010 | 9/1990 | United Kingdom . |

OTHER PUBLICATIONS

English language abstracts of Japanese Patents JP-6-3-286836, JP-1-140136 and JP-56-066809.

*Primary Examiner*—Bruce Y. Arnold
*Assistant Examiner*—Thong Nguyen
*Attorney, Agent, or Firm*—Sandler Greenblum & Bernstein

[57] ABSTRACT

In a camera lens unit having a plurality of spaced lenses and a lens supporting frame which supports the lenses, so that an image of an object to be photographed formed by the lenses is focused on an image plane, a light intercepting mask, having an opening whose shape is substantially analogous to the shape of an image formed on the image plane is provided and is formed integrally with the lens supporting frame.

18 Claims, 2 Drawing Sheets

LIGHT INTERCEPTING MASK OF LENS

BACKGROUND OF THE INVENTION

1. Field of the Invention

The present invention relates to a mask for intercepting light for a lens and more precisely, it relates to a light intercepting mask which prevents ghost or flare or the like produced by a specific reflecting surface of a lens of a photographing lens unit consisting of groups of lenses.

2. Description of Related Art

A photographing lens unit in a recent camera is compact but complicated to increase the zoom power (magnification), resulting in a complex internal construction of the lens barrel. For instance, in a lens arrangement shown in FIG. 4 in which a group of rear lenses (rear lens group L2) is constituted by a meniscus lens having a concave surface on the side thereof adjacent to an object to be taken, incident light through the upper periphery of a group of front lenses (front lens group L1) is first reflected by a front surface B (on the object side) of a third lens of the rear lens group L2 closest to a film F and is then reflected by a rear surface C (on the film side) of a second lens (intermediate lens) of the rear lens group L2 to be focused on a point D. An image of the point D may be exposed and formed as a ghost E on the film F.

In the lens system shown in FIG. 4, the front surface B of the third lens of the rear lens group L2 defines a specific reflecting surface by which the ghost is produced. No ghost can be completely prevented by an aperture frame G which is located in rear of the specific reflecting surface to define an image plane.

Furthermore, in a normal photograph, the film plane is rectangular with a longer horizontal side, whereas the photographing lens is circular in cross section. Consequently, in particular, incident light (luminous flux) through the upper and lower edges of the photographing lens includes a large amount of harmful components, thus resulting in a production of a ghost.

It is known to provide a hood in front of the photographing lens in order to eliminate the ghost.

However, a conventional hood has a circular cross sectional shape corresponding to the front shape of the photographing lens, and accordingly, there is a difference in shape between the image plane and the front portion of the lens. In particular, in a zoom lens, since an angle of view (focal length) varies, it is very difficult to realize a simple hood which can effectively prevent the ghost through all the angles of view.

Note that in the present application, a lens surface which causes an image to be damaged (e.g. by a ghost) is referred to as a specific reflecting surface.

SUMMARY OF THE INVENTION

The primary object of the present invention is to provide a photographing lens having a simple light intercepting mask which can effectively intercept harmful light to keep it out of the image plane.

To achieve the object mentioned above, according to an aspect of the present invention, there is provided a light intercepting mask which is substantially analogous to an image plane and which is formed integrally with a lens frame to which the lenses are secured to fix the relative positions of the lenses.

With this arrangement, unnecessary light (luminous flux) which does not form an image plane can be intercepted by the intercepting mask before being transmitted through the final lens.

According to another aspect of the present invention, in a photographing lens having a lens with a specific reflecting surface which may have an adverse influence on an image, a light intercepting mask is provided and is located in a space defined between lenses located closer to an object to be photographed than the specific reflecting surface to permit only usable light which defines an image plane to pass therethrough, to thereby intercept unnecessary light outside the limits of usable light.

With the construction mentioned above, harmful light which causes a ghost on the image plane or the image can be effectively intercepted by the light intercepting mask before reaching the specific reflecting surface.

Preferably, the light intercepting mask is formed integrally with the rear lens group of a zoom lens, so that the light intercepting mask can move together with the rear lens group during zooming, resulting in a substantially complete interception of the harmful light, regardless of the focal length.

BRIEF DESCRIPTION OF THE DRAWINGS

The invention will be described below in detail with reference to the accompanying drawings, in which.

DESCRIPTION OF PREFERRED EMBODIMENTS

In the illustrated embodiment, a zoom lens to which the embodiment is applied is secured to a camera body (not shown) through an outermost housing 10. On the inner peripheral surface of the housing 10 are formed one or a plurality of linear guide grooves 11 which extend parallel to the optical axis X.

Figure 1:
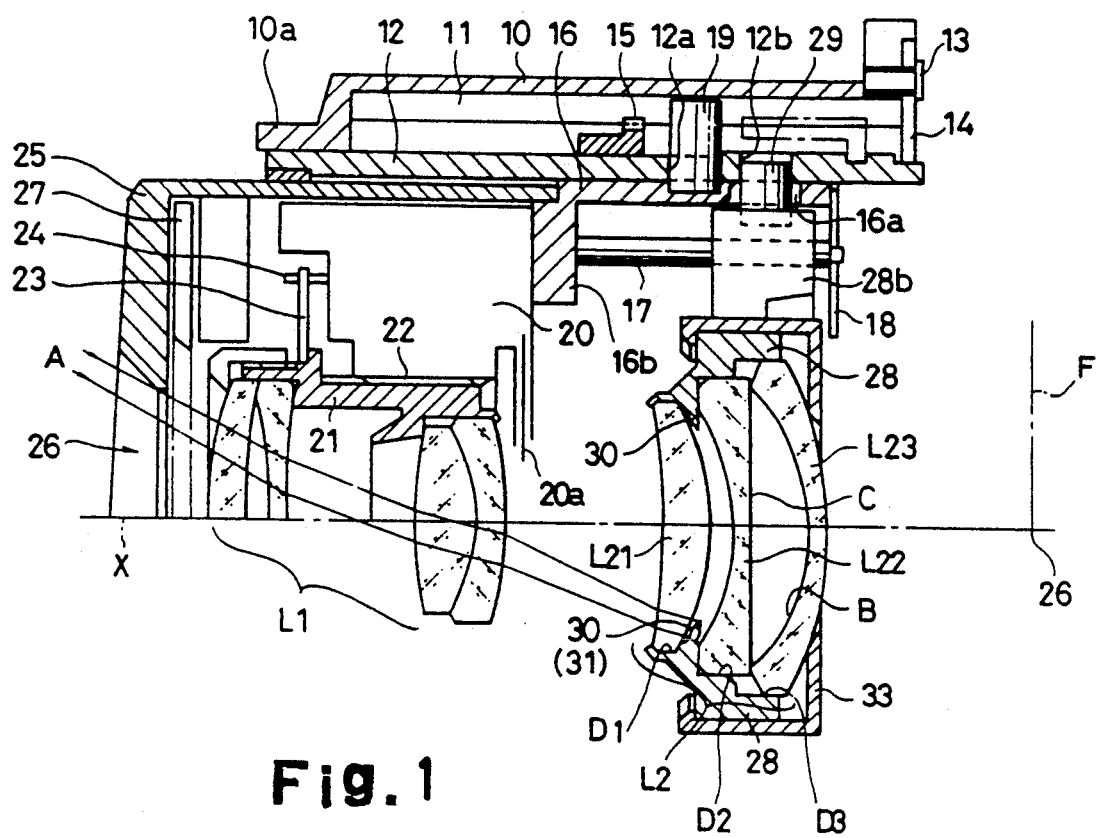
FIG. 1 is a longitudinal sectional view taken along a plane including an optical axis, of a zoom lens to which an embodiment of the present invention is applied.
Figure 2:
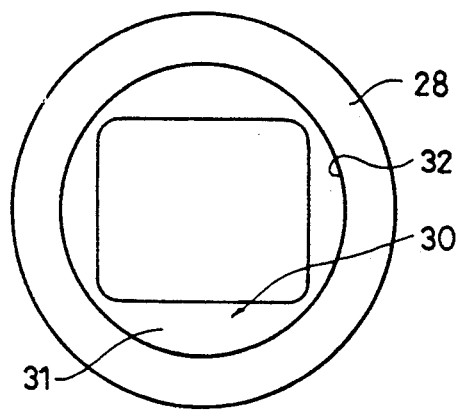
FIG. 2 is a front elevational view of a light intercepting mask shown in FIG. 1.

A cam ring 12 which rotates without moving in the axial direction is housed in the housing 10. The cam ring 12 is rotatably supported, at its front end by a small diameter portion 10a of the housing 10, and, at the rear end thereof by a supporting plate 14 which is secured to the housing 10 by screws 13 (only one screw is shown in FIG. 1).

The cam ring 12 has one or a plurality of cam grooves 12a (front lens cam grooves) for the front lens group and one or plural cam grooves 12b (rear lens cam grooves) for the rear lens group. A sector gear 15 is secured to the outer peripheral surface of the cam ring 12. The sector gear 15 is engaged by the pinion of a zoom motor (not shown), so that the cam ring 12 is rotated by the zoom motor.

A slide ring 16 is located in the cam ring 12 so as to slide in the axial direction. The slide ring 16 is provided on its front end with a radially extending flange portion 16b to which three guide rods 17 (only one guide rod is shown) are secured. The guide rods 17 are spaced from one another at a predetermined angular distance and extend parallel to the optical axis X. The guide rods 17 are secured at their rear ends to a light intercepting plate 18 which is in turn secured to the rear end of the slide ring 16, so that the guide rods move together with the slide ring 16 in the optical axis direction.

The slide ring 16 is provided with cam pins 19 (rear lens cam pins) for the rear lens group. The rear lens (one or more) cam pin 19 extend through the front lens cam groove 12a of the cam ring 12, so that the upper ends thereof are fitted in the associated linear guide groove 11. Consequently, when the cam ring 12 rotates, the slide ring 16 moves in the optical axis direction along the cam profile of the front lens cam groove 12a without rotating. The rotation of the slide ring 16 is prevented by the linear guide groove 11.

To the front end of the slide ring 16, a per se known shutter block 20 is secure and has shutter blades 20a. A front lens group supporting frame 21 which supports the front lens group L1 is supported in the shutter block 20 through a helicoid 22.

The front lens group supporting frame 21 has a connecting plate 23 connected thereto, which extends in the radial direction and which is engaged by a focus adjusting rod 24 projecting from the front face of the shutter block 20. The focus adjusting rod 24 which extends in the optical axis direction is circumferentially rotated by a pulse motor (not shown) incorporated in the shutter block 20 to rotate the front lens group supporting frame 21 through the connecting plate 23, so that the front lens group L1 can be moved in the optical axis direction in accordance with the lead of the helicoid 22 to complete the focusing.

On the outer periphery of the shutter block 20, there is provided a decorative ring 25 which has a lens aperture 26 formed on the front end thereof. A barrier 27 is provided behind the lens aperture 26 to open and close the same.

Figure 3:
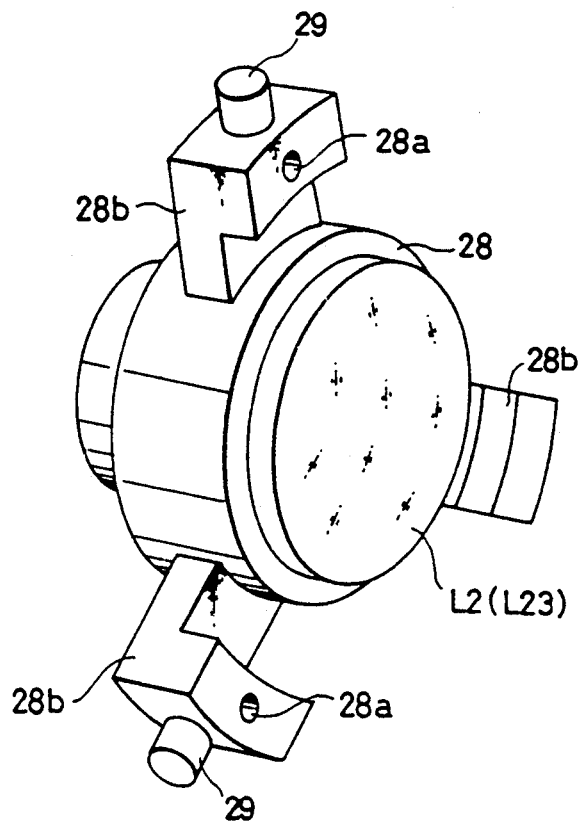
FIG. 3 is a perspective view of a rear lens group supporting frame on which a light intercepting mask is provided; and, FIG. 4 is a longitudinal sectional view of a conventional zoom lens for explaining how a ghost is caused.

A rear lens group supporting frame 28 which supports the rear lens group L2 is slidably supported by the guide rods 17. The rear lens group supporting frame 28 has three leg portions 28b which have through holes 28a in which the guide rods 17 and cam pins 29 are inserted, as shown in FIG. 3.

The cam pins 29 extend through linear guide grooves 16a formed in the slide ring 16 in parallel with the optical axis X to be fitted in the corresponding rear lens cam groove 12b of the cam ring 12. Thus, when the cam ring 12 rotates, the rear lens group supporting frame 28, and accordingly the rear lens group L2 are moved in the optical axis direction along the guide rods 17 in accordance with the profile of the rear lens cam groove 12b without rotating. Also, the rotation of the cam ring 12 causes the front lens group L1 to move along the linear guide groove 11 in accordance with the profile of the front lens cam groove 12a without rotating, so that a spatial distance between the front lens group L1 and the rear lens group L2 varies while keeping a predetermined relationship to vary the focal length (angle of view).

The following description will be directed to a light intercepting mask 30 which is one of the most significant features of the present invention.

The light intercepting mask 30 is formed integrally with the rear lens group supporting frame 28 which is made of synthetic resin. The rear lens group supporting frame 28 has an annular contour and is provided, on its inner periphery, with stepped portions D1, D2 and D3 having diameters gradually increasing in this order. The first lens L21, the second lens L22 and the third lens L23 of the rear lens group L2 are secured to the associated stepped portions D1, D2 and D3, with predetermined spatial distances therebetween, respectively.

The light intercepting mask 30 is formed integrally with the rear lens group supporting frame 28 between the stepped portions D1 and D2 in the space between the first lens L21 and the second lens L22. The light intercepting mask 30 extends in the radial direction toward the optical axis X from the outer periphery of the lens to surround an outermost portion of the usable light (luminous flux) which defines an image plane. Namely, the light intercepting mask 30 has a light intercepting wall 31 which extends inwardly from the annular rear lens group supporting frame 28 and which has a center opening 32 through which the usable light (luminous flux) passes. The opening 32 of the light intercepting mask 30 is analogous to the image plane, so that among luminous flux incident upon the front lens group L1, only a usable component (usable luminous flux) can pass through the opening 32 and unusable luminous flux which does not contribute to the formation of an image plane can be effectively intercepted.

Figure 4:
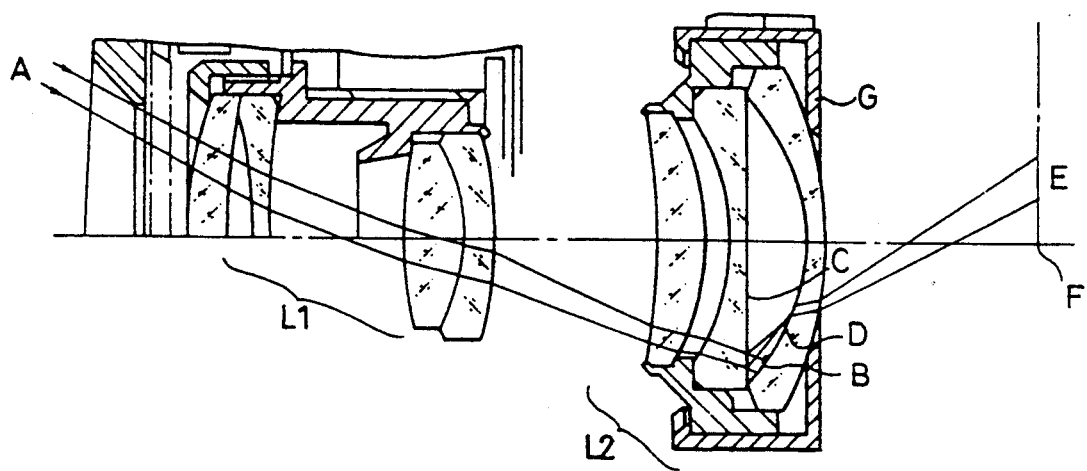

The light intercepting mask 30 is coated with an antireflection layer, so that the unusable light or luminous flux mentioned above is absorbed by the surface of the light intercepting wall 31 of the light intercepting mask 30. As a result, no light reaches behind the light intercepting mask 30 and the second lens L22. Numeral 33 designates a light intercepting lens frame which is fitted on the rear lens group supporting frame 28 and which corresponds to the known light intercepting frame G in FIG. 4.

According to the illustrated embodiment, unusable light which is made incident through the upper portion of the lens aperture 26 in oblique directions intersecting the optical axis X to reach the lower portion of the first lens L21 of the rear lens group L2 is transmitted through the first lens L21 and is then incident on the light intercepting wall 31 of the light intercepting mask 30 to be absorbed thereby. Accordingly, no harmful light reaches the film F (FIG. 4) through the light intercepting mask 30, so that a ghost which would be otherwise produced due to light reflected by the specific reflecting surface B of the third lens L23 is not produced on the film F.

Furthermore, unusable light which is made incident through the lower edge of the lens aperture 26 in directions intersecting the optical axis X can be similarly absorbed by the light intercepting mask 30.

Although the above discussion has been directed to a zoom lens having two lens groups, a front group of lenses and a rear group of lenses, the present invention is not limited thereto. Namely, for example, the present invention can be applied to a zoom lens having more than two groups of lenses. The position of the light intercepting mask 30 depends on the number of lens groups and the arrangement of the lenses. For instance, if the specific reflecting surface is defined by the front surface of the first lens L21, the light intercepting mask 30 is located in a space closer to the object than the first lens L21. In short, the light intercepting mask 30 is provided in front of the specific reflecting surface which causes damage, such as a ghost on the film.

The specific reflecting surface referred to herein means a reflecting surface which causes an image other than a desired image of an object to be photographed to be formed in an image plane.

In the illustrated embodiment, although the light intercepting mask 30 is formed integrally with the rear lens group supporting frame 28, the light intercepting mask 30 can be formed separately.

In an alternative, it is possible to provide the light intercepting mask closer to the lens.

As can be seen from the above discussion, according to the present invention, since harmful light which causes a ghost or the like can be effectively intercepted by a light intercepting mask which is located in a space between the lenses closer to an object to be taken than the specific reflecting surface by which the harmful light is reflected, only usable light can be focused in an image plane, regardless of the focal length.

We claim:

1. A camera lens unit including a light intercepting mask positioned in the camera lens unit having a plurality of lenses spaced from one another, and a lens supporting frame which supports the lenses secured thereto, so that an image of an object to be taken formed by the lenses is focused on an image plane, the image formed by said lenses defining an imaged area having a predetermined shape, said light intercepting mask having an opening with a shape which is substantially rectangular and analogous to the shape of the imaged area formed on the image plane and which is formed integrally with the lens supporting frame, said mask located in a space between the spaced lenses of said camera lens unit.

2. The light intercepting mask according to claim 1, wherein said lens supporting frame and said light intercepting mask are integrally made of synthetic resin.

3. The light intercepting mask according to claim 1, wherein said light intercepting mask is made of synthetic resin.

4. The light intercepting mask according to claim 1, wherein said light intercepting mask is coated with an anti-reflection layer.

5. A photographing optical system including a light intercepting mask positioned in the photographing optical system, and which forms an image of an object on an image plane, said image defining an imaged area having a specific shape, said system having an optical axis, said photographing optical system is provided with a lens group having a plurality of spaced lenses including a lens which has a specific reflecting surface which has an adverse influence on the image formed on the image plane, said light intercepting mask having an opening with a shape substantially analogous to the specific shape of the imaged area, said opening being substantially rectangular, said mask located in a space between the spaced lenses closer to an object to be taken than the specific reflecting surface to permit only usable light which defines the image on the image plane to pass through the light intercepting mask and to intercept unusable light outside the usable light.

6. The photographing optical system according to claim 5, further comprising a lens supporting frame which movably supports the lens having the specific reflecting surface so as to move said lens having the specific reflecting surface along the optical axis direction.

7. The light intercepting mask according to claim 6, wherein said light intercepting mask is integrally formed with the lens supporting frame.

8. The light intercepting mask according to claim 5, wherein said light intercepting mask is mounted to the lens having the specific reflecting surface.

9. The photographing optical system according to claim 5, wherein said light intercepting mask has an opening with a shape analogous to the shape of an imaged area formed on the image plane, so that the opening permits only the useable light to pass therethrough, whereby the unusable light can be absorbed by a peripheral edge of the opening of the light intercepting mask.

10. The light intercepting mask according to claim 5, wherein said photographing optical system is a zoom lens having front and rear lens groups.

11. The light intercepting mask according to claim 10, wherein said lens having the specific reflecting surface is constituted by one of the rear lens group.

12. The light intercepting mask according to claim 11, wherein said specific reflecting surface is a concave surface of said one lens of the rear lens group on the object side.

13. A photographing optical system including a light intercepting mask positioned in the photographing optical system, and which forms an image of an object on an image plane and defines an imaged area having a specific shape, said photographing optical system is provided with a lens group having a plurality of spaced lenses including a lens which has a specific reflecting surface which has an adverse effect on the image formed on the image plane, said light intercepting mask is located in a space between the spaced lenses closer to an object to be taken than the specific reflecting surface and which has a light absorbing portion which absorbs light which would otherwise be incident on the specific reflecting surface, said mask having a substantially rectangular opening with a shape substantially analogous to the specific shape of the imaged area formed on the image plane.

14. The photographing optical system according to claim 13, wherein said light intercepting mask and a lens supporting frame for supporting said spaced lenses are integrally formed.

15. A photographing optical system including a light intercepting mask positioned in the photographing optical system, and which forms an image of an object on an image plane, the image defining an imaged area having a specific shape, said photographing optical system is provided with a lens group having a plurality of spaced lenses including a lens which has a specific reflecting surface which reflect unusable light which does not form the image of an object to be taken on the image plane, said light intercepting mask is located in a space between the spaced lenses closer to the object to be taken than the specific reflecting surface, said mask having a substantially rectangular opening with a shape substantially analogous to the specific shape of the imaged area formed on the image plane to permit only usable light which forms the object image to pass therethrough and to intercept the unusable light.

16. A photographing optical system including a light intercepting mask positioned in the photographing optical system, and which forms an image of an object on an image plane, the image defining an imaged area having a specific shape, said photographing optical system is provided with a lens group having a plurality of spaced lenses including a lens which has a specific reflecting surface which causes ghost or flare due to reflection of light therefrom, said light intercepting mask is located in a space between the spaced lenses closer to the object to be taken than the specific reflecting surface to intercept or absorb light which would otherwise be incident on the specific reflecting surface, said mask having a substantially rectangular opening with a shape substantially analogous to the specific shape of the imaged area formed on the image plane.

17. A photographing optical system including a light intercepting mask positioned in the photographing optical system, and which forms an image of an object on an image plane, the image defining an imaged area having a specific shape, said photographing optical system is provided with a lens having a plurality of spaced lenses including a lens which has a specific reflecting surface which reflects light which does not form an image of an object to be taken on the image plane, said light intercepting mask is located in a space between the spaced lenses closer to the object to be taken than the specific reflecting surface to intercept or absorb light which would otherwise be incident on the specific reflecting surface, said mask having a substantially rectangular opening with a shape substantially analogous to the specific shape of the imaged area formed on the image plane.

18. A photographing optical system including a light intercepting mask positioned in the photographing optical system, and which forms an image of an object on an image plane, the image defining an imaged area having a specific shape, said photographing optical system is provided with a lens group having a plurality of spaced lenses including a lens which has a specific reflecting surface which causes ghost or flare due to reflection of light therefrom, said light intercepting mask is located in a space between the spaced lenses closer to the object to be taken than the specific reflecting surface to permit only usable light which forms the object image to pass therethrough and to intercept unusable light, said mask having a substantially rectangular opening with a shape substantially analogous to the specific shape of the imaged area formed on the image plane.

* * * * *